M. A. JONES.
COTTON CHOPPER.
APPLICATION FILED MAY 17, 1917.

1,258,340.

Patented Mar. 5, 1918.
4 SHEETS—SHEET 1.

Inventor
Martin A. Jones
By
, Attorneys

M. A. JONES.
COTTON CHOPPER.
APPLICATION FILED MAY 17, 1917.

1,258,340.

Patented Mar. 5, 1918.
4 SHEETS—SHEET 4.

Inventor
Martin A. Jones

By
*[signature]*, Attorneys

UNITED STATES PATENT OFFICE.

MARTIN A. JONES, OF McGREGOR, TEXAS.

COTTON-CHOPPER.

1,258,340.  Specification of Letters Patent.  Patented Mar. 5, 1918.

Application filed May 17, 1917. Serial No. 169,294.

*To all whom it may concern:*

Be it known that I, MARTIN A. JONES, a citizen of the United States, residing at McGregor, in the county of McLennan and State of Texas, have invented certain new and useful Improvements in Cotton-Choppers, of which the following is a specification.

This invention relates to cotton choppers and the object of the invention is to provide a simple and efficient mechanism which may be attached to a riding cultivator and coupled therewith so as to be driven therefrom and by the use of which surplus plants may be cut out from a row in advance of the cultivator blades. The invention seeks to provide mechanism whereby the chopper blade may be most effectively brought against the plants to be cut out so that the working stroke of the blade will be attained with slight strain upon the operating mechanism.

The invention is illustrated in the accompanying drawings, in which—

Figure 1:
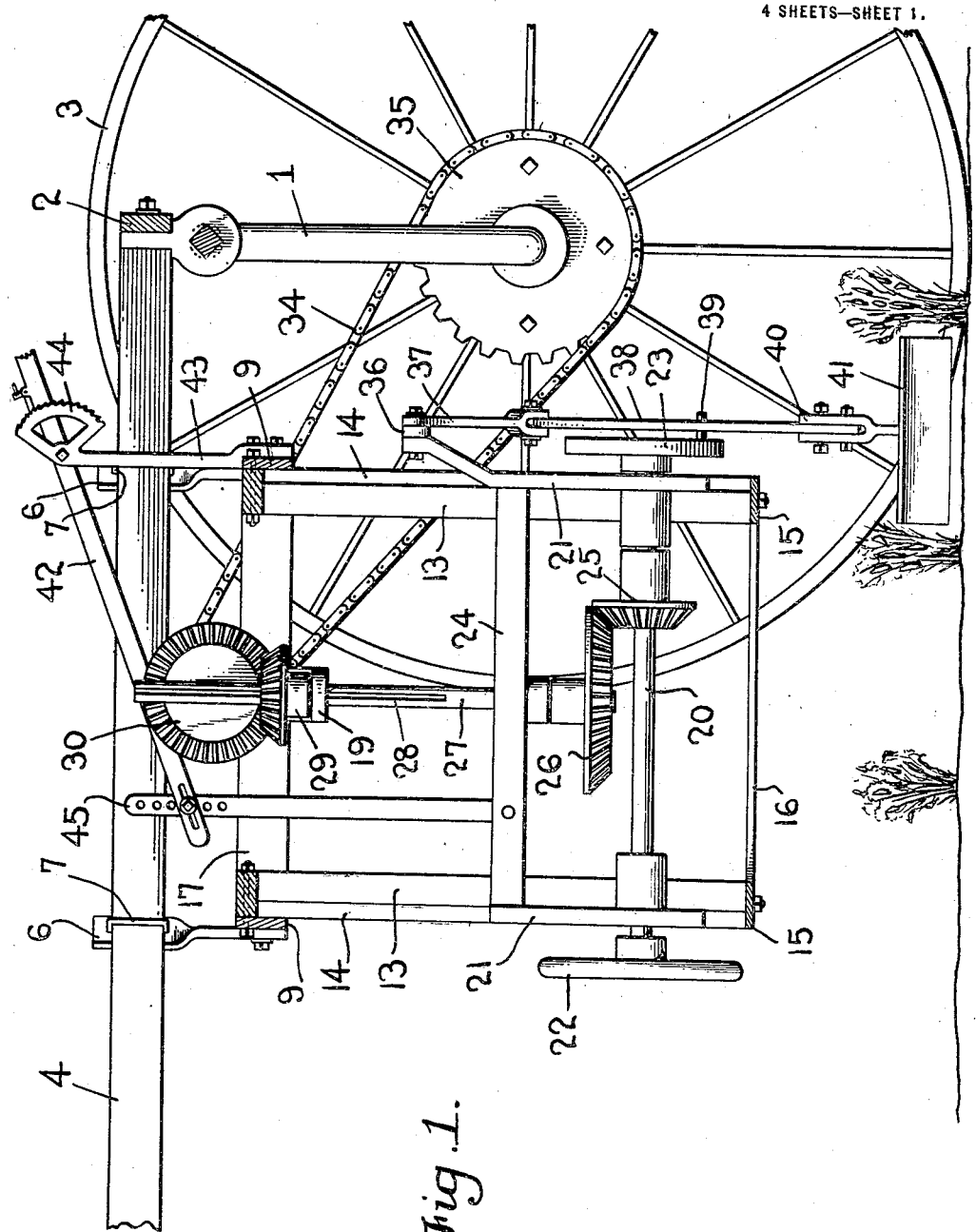
Figure 1 is a view partly in side elevation and partly in longitudinal section showing my improved chopping mechanism mounted upon a cultivator frame.
Figure 2:
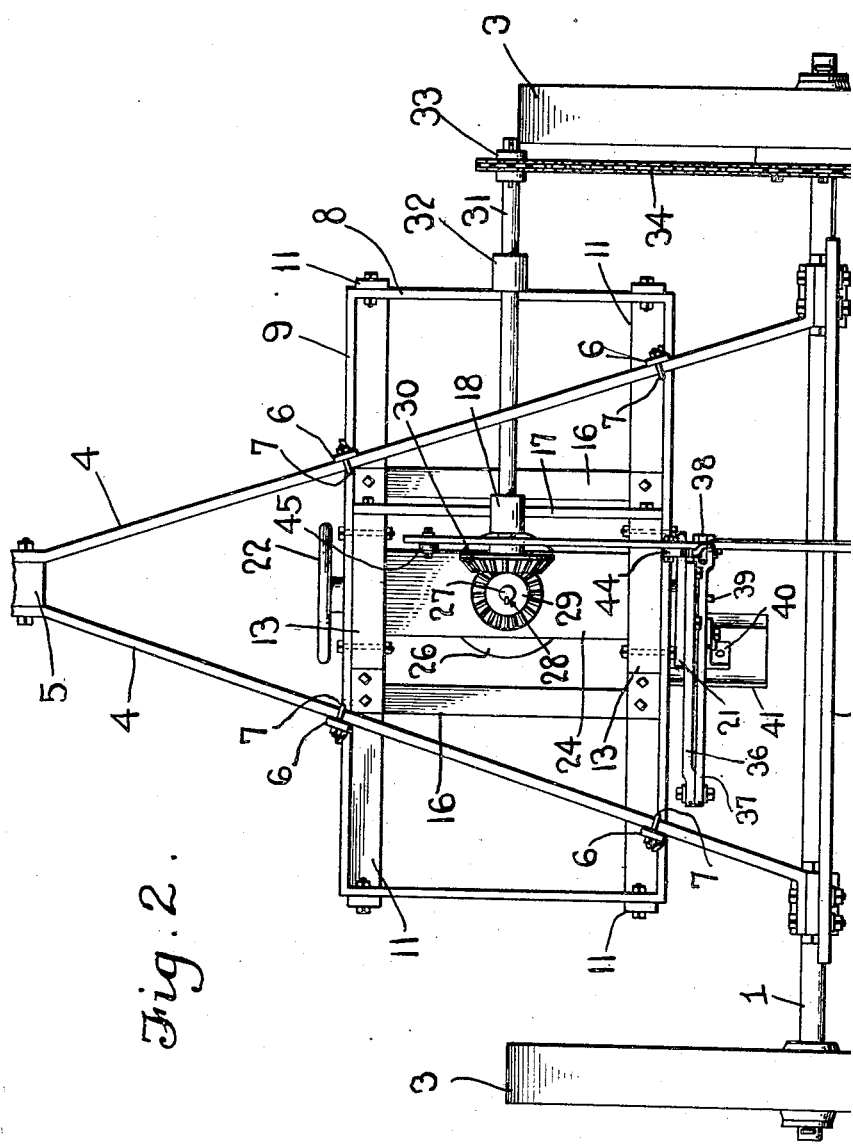
Fig. 2 is a plan view.
Figure 3:
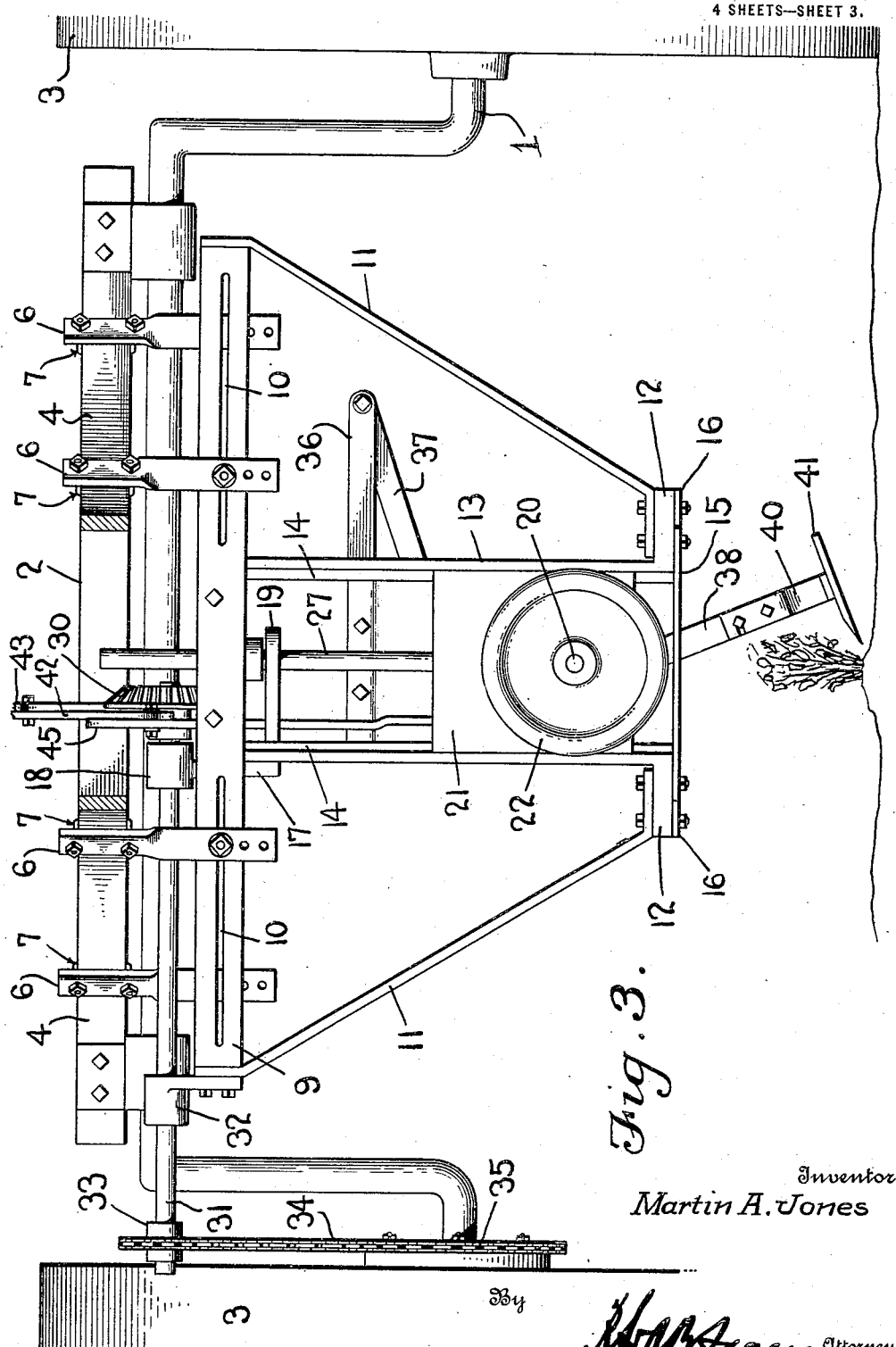
Figs. 3 and 4 are respectively front and rear end elevations.
Figure 4:
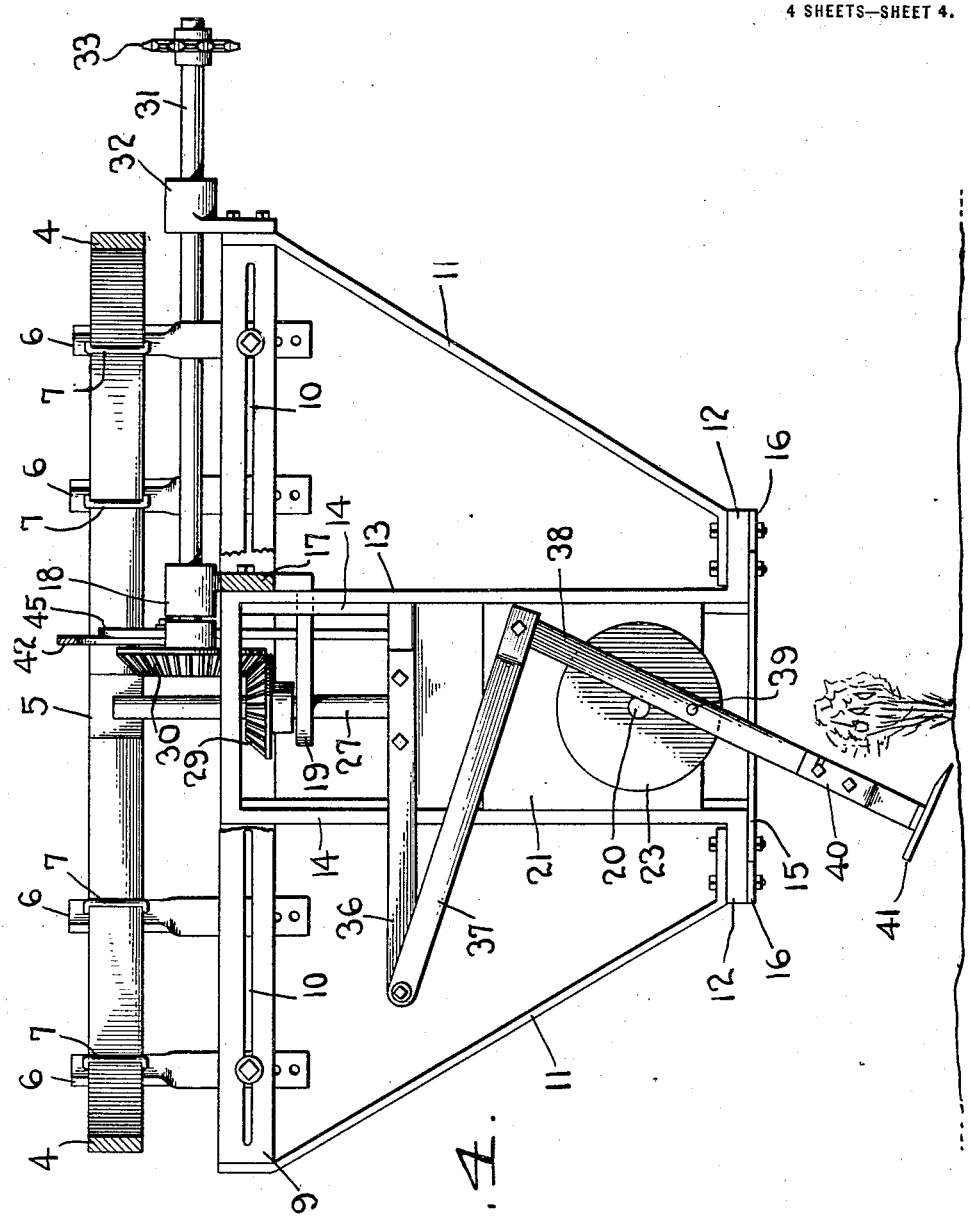

The cultivator may be of any desired type and the accompanying drawings show only so much of the cultivator as is deemed necessary for an understanding of the invention. In the drawings, the reference numeral 1 denotes the end portions or spindles of the cultivator axle and 2 denotes a cross bar secured rigidly to and connecting said end portions while 3 designates the ground wheels. The hounds 4 are secured to the cross bar 2 and converge forwardly to a tongue or draft pole 5 to the rear end of which their front ends are rigidly secured.

In carrying out my present invention, I secure to the hounds 4 hangers or brackets 6 by means of clips or clamps 7 and to the lower ends of said hangers, I secure a supporting frame consisting of longitudinal bars 8 and transverse bars 9 rigidly connected together at their ends or formed integral. The hangers are secured to the transverse bars by suitable bolts passing through the longitudinal slots 10 in said bars whereby the hangers may be adjusted to the distance between the hounds, as will be readily understood. At the corners of the frame composed of the bars 8 and 9, I secure the upper ends of straps or suspending brackets 11 which have their lower ends turned inwardly and rigidly secured to the outwardly projecting lugs or flanges 12 on the lower ends of inverted U-shaped frames or standards 13 which are disposed at the front and rear sides of the said carrying frame. The inner opposed faces of the side members of these inverted U-shaped standards are constructed with grooved or rabbeted portions 14 which form guides or ways for the slidable chopper frame, as will be presently set forth. The lower ends of the side members of each of said U-shaped frames or standards are connected by transverse straps 15, and longitudinal straps 16 are also secured to the flanges 12 and serve to connect the front and rear standards or U-shaped frames, a very rigid, strong and durable supporting or carrying frame being thus produced. The upper ends of the frames or standards 13 are further connected at one side by the bar 17 and this bar 17 has a collar or bearing 18 formed on its upper side while on its lower edge or side is provided a transversely disposed bracket or arm 19.

The chopper shaft 20 is journaled in suitable bearings on the end plates 21 and extends through said plates being provided with a fly wheel 22 on its front end and with a crank disk 23 on its rear end, as clearly shown. The end plates 21 have their side edges slidably fitted to the ways or guides 14 and are connected at their upper ends by a longitudinal beam or brace 24 so that a rigid structure will be produced and the end plates will be prevented from falling from the guides 14. A pinion 25 is secured upon the chopper shaft 20 and this pinion meshes with a beveled gear 26 which is secured to the lower end of a vertically disposed shaft 27 which is journaled in the beam or brace 24 and constructed with a longitudinal groove 28. The shaft 27 extends through the bracket or arm 19 and is adapted to rotate therein, while a beveled pinion 29 is disposed above and supported by the said bracket or arm and has a feathered connection with the shaft 27 so that while the rotation of the pinion will be transmited to the shaft, the shaft may play vertically through the pinion. This beveled pinion 29 meshes with and is held against upward movement by a beveled gear 30 which is secured upon the inner end of a shaft 31 which is suitably journaled in the bearing 18 and in a similar bearing 32 on one of the longitudinal bars 8. On the outer end of the shaft 31 is a sprocket 33 which is operatively connected by a chain 34 with a sprocket wheel 35 secured to one of the ground wheels 3 so that as the cultivator is driven along the row of plants, the rotation of the ground wheel will be transmitted to the chopper shaft, as will be readily understood. The rear end plate 21 has its upper edge offset so as to project slightly from the adjacent standard or frame 13 and to the offset portion I rigidly secure a lateral supporting arm 36 to the outer end of which is pivoted a vibratory arm or lever 37 which extends toward the central plane of the machine and is pivoted to the upper end of the cutter shank or stem 38. This cutter shank or stem is pivotally mounted intermediate its ends upon the wrist pin 39 carried by the crank disk 23 and to the lower end of said shank is pivotally attached the shoe 40 carrying the blade or cutter 41. It will be readily understood that the rotation of the cutter shaft 20 which is derived through the described mechanism from the ground wheels 3, causes the shank or stem 38 to move up and down and back and forth with the wrist pin 39, so that if the shank was otherwise free or unattached, the blade would describe a circular path. Inasmuch, however, as the upper end of the shank is pivotally attached to the inner end of the oscillatory arm or lever 37, lateral movement of the upper end of the shank is limited and correspondingly amplified at the lower end so that the blade will describe an elliptical path and will act upon the plants when moving at its greatest speed. This elliptical orbit of the blade will also cause it to take into the earth sharply and then effect a relatively long movement across the row of plants and then quickly rise from the earth before returning above the plants to its starting point.

The depth at which the blade will operate may be determined, of course, by setting the frame, consisting of the end plates 21 and the brace bar 24, at any desired height and to effect this adjustment, I provide a lever 42 which is fulcrumed upon a bracket 43, secured upon the carrying frame, and having its rear end disposed within convenient reach of the driver. The lever will, of course, be equipped with the usual latch device to coöperate with the holding segment 44 and the front end of the lever is pivotally connected to a link or post 45 pivoted to and rising from the bar 24, as will be readily understood and as shown in Fig. 1. By manipulating the lever 42, the chopper can obviously be set to run at any desired depth and it will be possible for the driver to so manipulate this lever as to cut out some plants at a greater depth than others or to raise the chopper frame to such a point at intervals as will enable the blade to entirely clear the plants.

The machine is obviously very simple in the construction and arrangement of its parts and may be advantageously employed for thinning out various plants. It is neat and attractive in its appearance and will operate effectually without perceptibly increasing the draft of the machine.

Having thus described the invention, what is claimed as new is:

1. In a machine for the purpose set forth, the combination of a frame consisting of longitudinal and transverse bars, inverted U-shaped standards secured to the front and rear transverse bars, suspending straps having their upper ends secured to said frame and their lower ends secured to the lower ends of said inverted U-shaped standards, straps extending across the lower ends of the U-shaped standards, and other straps secured to and connecting the ends of said standards.

2. The combination with the hounds of a cultivator, of hangers secured upon said hounds and depending therefrom, a frame secured to and carried by the lower ends of said hangers, suspending straps secured to said frame, inverted U-shaped standards carried by the lower ends of said suspending straps, connections between the lower ends of said standards, connections between the sides of each of said standards, a longitudinal bar connecting the upper ends of said standards, a chopper frame slidably fitted to said standards, and operating mechanism mounted upon the first-mentioned frame, the longitudinal bar connecting the upper ends of said standards, and the chopper frame.

3. In a machine for the purpose set forth, the combination of a frame adapted to be secured to the hounds of a cultivator, inverted U-shaped standards supported from said frame, a longitudinal bar connecting the upper ends of said standards, a bracket extending inwardly from said bar, a bearing on said bar, a bearing upon the frame alined with the bearing on the bar, a chopper frame slidably fitted to the standards, means for supporting the chopper frame, a driving shaft mounted in the bearings on the first-mentioned frame and said longitudinal bar, a gear on the inner end of said shaft, a pinion supported by the bracket on said bar and meshing with said gear, a vertically disposed shaft slidably engaging said pinion but constrained to rotate therewith, a chopper shaft carried by the chopper frame, and gearing connecting said chopper shaft with the said vertically disposed shaft.

In testimony whereof I affix my signature.

MARTIN A. JONES. [L. S.]